Sept. 8, 1953 T. R. SMITH 2,651,531
RESILIENT LOCKING MEANS
Filed April 22, 1950

INVENTOR.
Thomas R. Smith
BY
Wilkinson, Huxley, Byron & Hume
ATTORNEY.

Patented Sept. 8, 1953

2,651,531

UNITED STATES PATENT OFFICE 2,651,531

RESILIENT LOCKING MEANS

Thomas R. Smith, Newton, Iowa, assignor to The Maytag Company, Newton, Iowa, a corporation of Delaware Application April 22, 1950, Serial No. 157,595

3 Claims. (Cl. 287—53)

1

The invention relates to a locking device, and more particularly to a resilient locking device for preventing relative axial shifting movement between a pair of members.

When a pair of members are connected together in driving relation means must be provided to insure a relatively tight connection between the two so that during operation they will not shift with respect to each other and separate or twist to such a degree that undue damage may be done to the connection. In accordance with this invention one of the members is preferably provided with a hub portion having a passage of any suitable configuration therein and the other member in the form of a shaft has one end formed to fit within and project through the passage. The projecting end of the shaft is provided with an axial recess or bore having an outer tapped portion and its inner end communicates with a radial hole extending through the shaft which is disposed adjacent the passage in the hub. Rubber or other resilient but substantially non-compressible material is placed in both the hole and inner portion of the recess and a set screw or other pressure applying means is placed in the outermost end of the recess. As the screw is tightened or moved inwardly it applies pressure to the resilient but substantially non-compressible material and causes a portion of the same to flow outwardly through the radial hole to contact the adjacent portion of the inner surface of the passage. This frictional connection tightens the normal connection and locks the two members together to prevent relative axial shifting movement and at the same time locks the set screw in position.

It is therefore an object of the invention to provide an improved connection for a pair of members which utilizes a resilient locking device to prevent relative shifting movement.

It is another object of the invention to provide an improved locking device for a pair of rotating members utilizing a resilient but substantially non-compressible locking material which is carried by one of the members and has a portion forced into engagement with the other member to thereby apply ample holding pressure for frictionally locking the same together without danger of damage to either of the members.

It is another object of the invention to provide an improved locking device for a pair of members which utilizes a resilient but substantially non-compressible material placed under pressure to force the same against the other member to thereby lock the members against axial movement.

2

It is another object of the invention to provide a resilient locking means for a pair of members and which means is also used to lock the pressure applying means to prevent it from becoming loose.

It is still another object of the invention to provide a resilient locking device which has means associated therewith to maintain the same under substantially constant pressure to compensate for variations in the resilient material used and any permanent set which may take place in the material.

Other objects, features, capabilities and advantages are comprehended by the invention, as will later appear and as are inherently possessed thereby.

Referring to the drawings.

Figure 1:
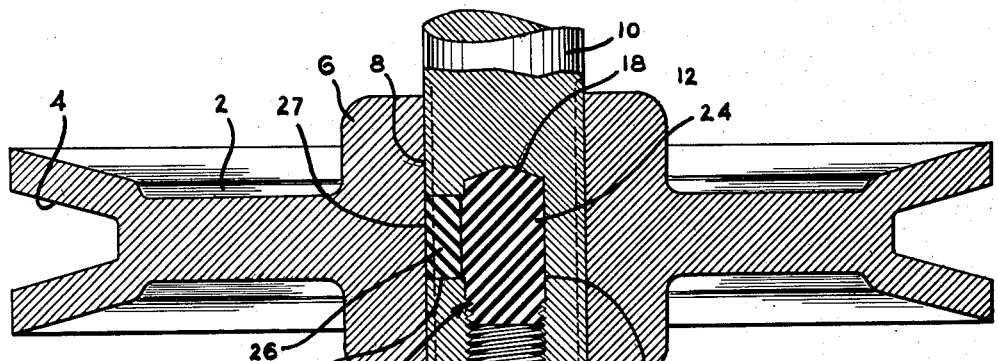
Figure 1 is a vertical sectional view of the improved resilient locking device applied to a shaft and pulley.
Figure 2:
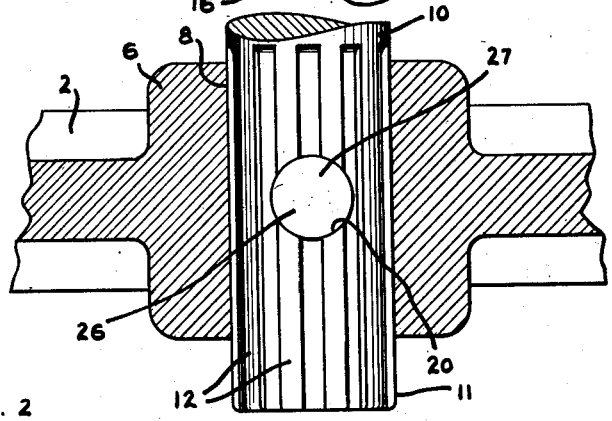
Figure 2 is a vertical elevational view of the shaft shown in Figure 1 showing the radial opening and plug and with the pulley broken away; and, Figure 3 is a vertical sectional view similar to that shown in Figure 1 showing a modified form of locking construction.

Referring now more in detail to the drawings, an embodiment selected to illustrate the present invention is disclosed in Figures 1 and 2 of the drawings and comprises a first member or pulley 2 having an outer V-groove 4 for engaging a belt (not shown) and an inner enlarged hub portion 6 which has a splined passage or bore 8 extending therethrough. A second member or shaft 10 has one end 11 thereof adapted to conformably fit in the passage 8 and is preferably provided with mating splines 12 cut in its outer periphery so that turning movement is transmitted from one member to the other regardless of which is the driving or driven member.

Under normal operating conditions, although a spline or similar connection insures positive turning movement of both members, means must be provided to prevent relative axial movement between the same which, if it should occur, may cause damage to the unit. Accordingly, the end 11 of the shaft projecting through the hub 8 is provided with a longitudinal co-axial recess or bore 14 extending from the outer end 16 of the shaft inwardly and terminating in an end wall 18 which is preferably intermediate the outer boundaries of the hub 6. The shaft also has a radial hole or opening 20 extending from the outer splined surface to the longitudinally extending recess 14 to provide an L-shaped passage which has one end disposed adjacent the splined passage 8 intermediate the ends of the hub 6 and the other end disposed in the end 16 of the shaft. In addition, the recess 14 is provided with a tap 21 adjacent the end 16 of the shaft to receive a set screw 22 or any suitable pressure applying means.

Resilient but substantially non-compressible material, such as, for example, rubber or the like, is placed in the recess 14 and the radially extending hole 20 to form the locking means 23 and in this particular installation it takes the form of a pair of separate resilient plugs 24 and 26. The plug 24 is disposed in the inner portion of the recess 14 and the plug 26 is placed in the radial hole 20. When the two members are assembled and it is desired to lock the same against relative axial movement the screw 22 is rotated in a direction to apply pressure to the plug 24 in the recess 14. Since one end of this plug is seated against the bottom wall 18 any pressure applied by the screw 22 causes a portion of the plug to move in the direction of the radial opening 20. When this occurs the displaced portion of the plug 24 displaces the plug 26 and causes its outer end to move outwardly to contact the adjacent portion of the wall of the passage 8 and frictionally engage the same. Thus when the set screw has been moved inwardly a sufficient amount the outer end 27 of the plug 26 moves outwardly and applies enough pressure between the members to thereby prevent or limit any relative axial movement. Also, since the cross-sectional area of the plug 26 is relatively large the danger of shearing the plug is minimized.

While the pressure applied maintains frictional contact of the plug 26 against the wall of the passage 8 and limits or prevents relative axial movement of the two members the plug 24 has an equal pressure acting against the inner end of the set screw 22 which in turn loads the same so that any tendency for the set screw to unloosen or turn, after setting, is minimized. Thus, with a construction of this type it is unnecessary to lock the set screw 22 in position once it has been tightened to the proper degree.

Another important feature of this locking connection is that it is not possible to damage either of the members through careless assembly or by applying too much pressure to the locking material. This feature is extremely valuable when it is necessary to assemble and disassemble the two members frequently. Also, the two members need not be assembled in the same position each time for proper locking.

Assuming the two members have been assembled and locked in position and it is desired to disassemble the members, the operator loosens the set screw 22 with any suitable means which in turn removes the pressure on the plugs. Due to the natural resiliency of the material forming the plugs they tend to assume their original shape. The plug 24 retracts back into the recess 14 and the plug 26 tends to move back into the radial portion of the passage and the outer surface 27 in contact with the passage 8 merely engages the same with but a relatively light pressure. After this operation the operator need but apply an axial force in the proper direction to one member and slide the same away from the other. The assembly operation will be the reverse of the above mentioned procedure.

Figure 3:
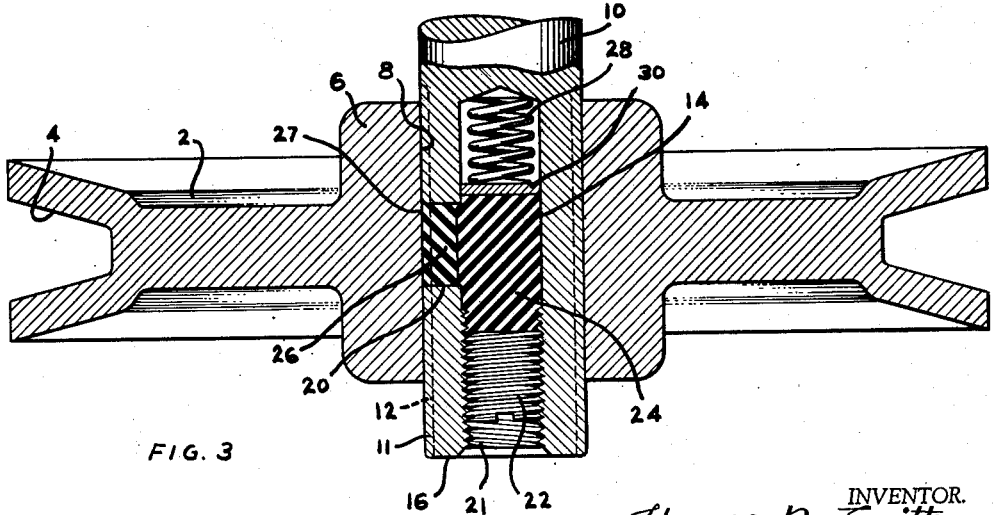

Referring now to the modification shown in Figure 3, similar elements have been given like reference characters, however, in this instance, the longitudinal recess 14 is extended beyond the radial opening 20 a distance sufficient to receive and enclose a compression type spring 28 and a washer or abutment means 30. The washer is used to provide a uniform surface for the inner end of the plug 24.

In this particular construction it can be seen that as the set screw 22 is tightened and pressure is applied to the plug 24 the amount of the pressure applied to the plug 26 in the radially extending opening 20 is limited by the preloading or strength of the spring 28. By limiting the pressure applied to the plugs the spring 28 acts to prevent extrusion of the material in the plug 26 between the two members and compensates for ageing or permanent set which may take place in the material used.

Although both embodiments show this resilient locking means applied to a shaft and pulley, it is to be understood that this particular locking means is applicable to other installations wherein it is desired to limit relative axial movement between a pair of members, and, under some condition, where mating cylindrical surfaces are used the frictional engagement of the plug with the adjacent side wall may be sufficient to lock the same against turning movements, assuming of course, that the torque to be transmitted is not excessive. Also, it is to be understood that the particular shape of the passage 8 is immaterial in that it and the mating shaft may be hexagonal, square, or keyed. It is to be noted that the resilient means also acts to provide a tightening means to compensate for a loose connection between the members. In addition, it is obvious that more than one radial opening for holding the resilient but substantially non-compressible material may be provided if so desired or if found necessary.

From the foregoing it can be seen that a resilient locking means has been provided whose frictional contact is effective to prevent relative axial shifting movement of a pair of members and which is capable of securely gripping the one member without damage to the same, and that the same resilient locking means is utilized to prevent loosening of the pressure applying means.

While I have herein described and upon the drawings shown illustrative embodiments of the invention, it is to be understood that the invention is not limited thereto but may comprehend other constructions, arrangements of parts, details and features without departing from the spirit of the invention.

It is claimed:

1. In a locking device, comprising a first member having a passage therethrough, a second member having an end closely fitting said passage and having a longitudinally extending recess therein and an outwardly extending opening communicating with said passage intermediate the ends of said recess, spring means carried in the inner end of said recess and provided with an abutment surface, resilient but substantially non-compressible material disposed in said outwardly extending opening and said recess in engaging relation with said abutment surface, and adjustable pressure applying means at the outer end of said recess for applying pressure to said material to force the same against said abutment surface and to cause the same to contact said first member and limit relative axial movement between said members, said spring means acting to limit the pressure applied to said resilient material.

2. A locking device comprising a first member having a passage therethrough, a second member having an end closely fitting said passage and having a longitudinally extending recess therein and a radial opening communicating with said passage intermediate the ends of said recess, yieldable means carried in the inner end of said recess provided with an abutment surface, a resilient but substantially non-compressible material disposed in said recess in engaging relation with said abutment surface and in said opening, and adjustable pressure applying means at the outer end of said recess for applying pressure to said material to force the same against said abutment surface and to cause the same to flow from said opening to contact said first member and limit relative axial movement between said members, said yieldable means acting to limit the pressure applied to said resilient material.

3. A locking device comprising a first member having a passage therethrough, a second member having an end closely fitting said passage, said end having a substantially cylindrical axial recess provided with an inner abutment surface and an outer tapped portion therein and an outwardly extending opening communicating with said passage adjacent said abutment surface, a pair of resilient but substantially non-compressible plugs one of which is disposed in said outwardly extending opening and having a length not greater than the same and the other in said axial recess in engaging relation to said abutment surface, and a set screw carried by the tapped portion of said recess for applying pressure to the plug in said axial recess to force the same against said abutment surface whereby a portion of said plug adjacent said outwardly extending opening is extruded into the same to force the plug therein outwardly into engagement with said first member to thereby prevent relative axial shifting movement of said members, said plug in said axial recess acting against the end of said set screw to prevent the same from loosening.

THOMAS R. SMITH.

References Cited in the file of this patent

UNITED STATES PATENTS

| Number | Name | Date |
|---|---|---|
| 596,303 | O'Neill | Dec. 28, 1897 |
| 821,379 | Rockwood | May 22, 1906 |
| 1,611,912 | Hleb | Dec. 28, 1926 |
| 1,866,112 | Kindelmann | July 5, 1932 |
| 2,273,102 | Harris et al. | Feb. 17, 1942 |
| 2,410,493 | Gideon | Nov. 5, 1946 |
| 2,504,496 | Carter | Apr. 18, 1950 |

FOREIGN PATENTS

| Number | Country | Date |
|---|---|---|
| 126,160 | Australia | of 1947 |
| 579,270 | Germany | of 1933 |